May 15, 1951     R. H. McFEE     2,553,420
RADIATION DETECTOR

Filed Sept. 29, 1948

Inventor
RAYMOND H. MCFEE

By M C Metcalf
Agent

Patented May 15, 1951

2,553,420

UNITED STATES PATENT OFFICE 2,553,420

RADIATION DETECTOR

Raymond H. McFee, Belmont, Mass., assignor to Photoswitch, Inc., Cambridge, Mass., a corporation of Massachusetts Application September 29, 1948, Serial No. 51,709

7 Claims. (Cl. 201—63)

This invention relates to photo-conductive cells and is particularly directed to stabilization of the response of the lead sulphide type of semiconductor cells to radiation.

A lead sulphide photo-conductive cell consists generally of a pair of electrodes connected by a semi-conductive film, mounted in an evacuated glass envelope. The electrodes are ordinarily made of gold or platinum wire fused onto the tube wall, or of colloidal graphite painted in lines to the desired points on the inner surface of the envelope. The electrodes are connected to conventional leads, sealed into a glass press. The film, which is deposited on the inner surface of the envelope in contact with the electrodes, exhibits a change in conductivity when exposed to radiation in the visible and sub-visible ranges of frequency. Cells of this type are used as radiation detectors, and their good sensitivity in the long infra-red region makes them especially suitable for fire and heat detection. The conventional two-electrode lead sulphide cell is, however, subject to an inherent disadvantage for such uses in that the film responds to conducted as well as radiated heat so that the "dark" conductivity and signal output of the cell vary according to the ambient temperature. The "dark" conductivity of the sensitive film also varies with age, a characteristic which interferes with maximum utilization of the sensitivity of the cell for general radiation detection purposes. The object of this invention is to provide a simple, but effective, means for compensating the effects of aging and ambient temperature variations on the conductivity of the sensitive film so that the overall output remains, under varying operating conditions and throughout the useful life of the tube, an accurate measure of the radiation impinging on the cell.

In the drawings illustrating the invention,

Figure 1:
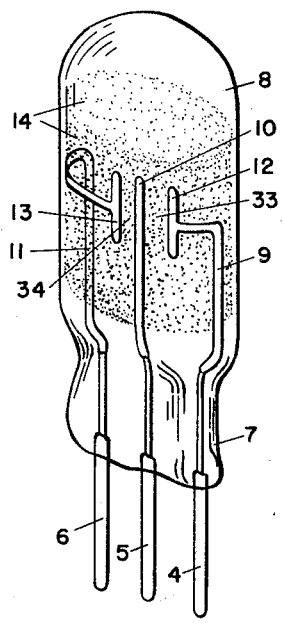
Fig. 1 is an isometric view of a partially completed cell of the type hereinafter described.

As illustrated in Fig. 1, a glass envelope 8 terminates in a press 7 into which three electrode leads 4, 5 and 6 are fused according to conventional practice in vacuum tube construction. The central electrode 10 consists of a line of conductive material connecting with lead 5 and running up the inner surface of the envelope. Parallel to electrode 10 and equidistant from it on either side are conductive lines 13 and 12, which form the working faces for contact with the sensitive film, and are connected by paths 11 and 9 to leads 6 and 4 respectively. The electrodes here illustrated are formed by painting colloidal graphite on the inner surface of the tube, but gold or platinum wire fused onto the envelope may be used. It is apparent that various other shapes and arrangements of electrodes may be suitable as long as the basic requirements, good contact with the film, adequate contact area, and proper spacing of the work faces, are satisfied. The sensitive film 14 is deposited on the inner surface of the envelope in a band covering the free ends of the electrodes. As previously stated, the conductivity of the material of which the film is composed varies under the effect of radiation. The conductivity of the area of the film between faces 12 and 13 is thus a function of radiation impinging on that area.

Figure 2:
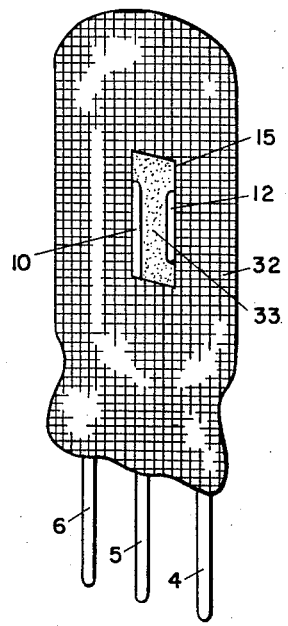
Fig. 2 is an isometric view of a complete cell.

Fig. 2 illustrates a cell of the same internal construction as Fig. 1 with an opaque mask 32 covering the exterior except for a window 15, which exposes the area of the envelope between electrodes 10 and 12. Since the purpose of the mask is to cut off radiation to the area of the film between electrodes 13 and 10, it is sufficient in some cases to mask off only that area, but it is generally preferable to cover the entire cell, except for a window, as here illustrated, to shut out extraneous and reflected radiation. The mask is here referred to as "opaque" but, since the chief purpose of the mask is to shut off from one of the paths, the particular frequency of radiation which is to be used to excite the cell, a material which is relatively impervious to that particular frequency, although not "opaque" in the ordinary sense, may be satisfactory for the mask. For example, a heat absorbing glass filter might be used where the exciting source emits radiation primarily in the infra-red. The mask here illustrated may be in the form of a separate shield, or a heavy paint, preferably black, may be applied to the envelope of the cell.

The masked, three electrode tube of Fig. 2 provides connections to two current paths over the sensitive film, of substantially equal lengths, leads 4 and 5 connecting to path 33, and leads 5 and 6 connecting to path 34. Since both areas are subject to the same conditions when the cell is "dark," that is, not receiving radiation of any of the frequencies to which the film is sensitive, it follows that the resistance of the two paths will remain equal regardless of ambient temperature fluctuations and variations in the film due to age. When radiation of the proper frequency impinges on the film exposed by window 15, however, a change occurs in the resistance of path 33. Since the differential between the resistances of the paths is due solely to excitation of the film by radiation, a signal which is purely a function of radiation can be derived from the cell.

Figure 3:
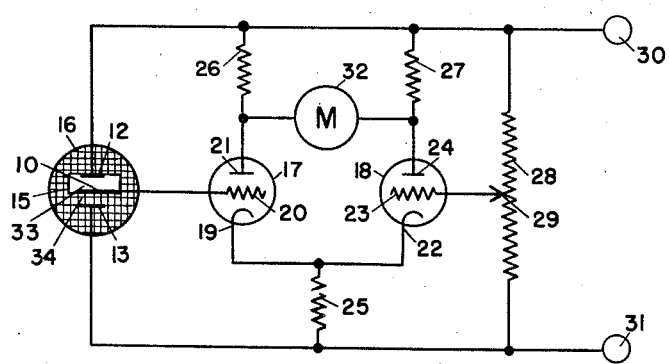
Fig. 3 is an electrical schematic diagram of a circuit suitable for use with a cell constructed in accordance with Fig. 2, corresponding parts of the cell being correspondingly numbered although symbolically illustrated.

Fig. 3 illustrates a circuit suitable for use with a three electrode cell of the type just described. The cell, generally indicated by the numeral 16, is symbolically illustrated in this figure, but the numerals 10, 12, 13 and 15 refer to the three electrodes, and the window, respectively, as illustrated in Figs. 1 and 2. The circuit is a balanced amplifier network supplied with either alternating or direct current from any conventional source (not shown) at terminals 30 and 31. A voltage divider resistance 28 is connected across the terminals. Two amplifier tubes 17 and 18, here illustrated as conventional triodes, are employed, their cathodes 19 and 22 being connected to a common cathode follower resistance 25. In the plate circuit of tube 17 is connected a load resistance 26, which is equal in magnitude to a load resistance 27 similarly connected in the plate circuit of tube 18. A meter 32 is connected between plates 21 and 24. With this arrangement, it is readily apparent that no current will flow in meter 32 as long as tubes 17 and 18 are equally conductive. If one tube becomes more conductive than the other, however, a corresponding increase will occur in the voltage drop across the load resistance of the more conductive tube. A current will then flow in meter 32, the magnitude of the current being proportionate to the differential in conductivity between the tubes.

The cell 16 is employed as a resistance voltage divider, electrodes 12 and 13 being connected to terminals 30 and 31 respectively. The central electrode 10 is connected to the grid 20 of tube 17. The grid 23 of tube 18 is connected to an adjustable tap 29 on resistance 28. In operation, tap 29 is adjusted while the cell is "dark" so that the potential of grid 23 is the same as that of grid 20. The tubes 17 and 18 are then equally conductive and no current flows in meter 32 as previously explained. With the circuit so adjusted, if cell 16 is exposed to radiation of the frequencies to which the film 14 is sensitive, the conductivity of the exposed path 33 increases while that of the unexposed path 34 remains unchanged. The potential of grid 20 rises and tube 17 becomes more conductive than tube 18. Meter 32 then indicates a current which is a measure of the intensity of radiation falling on cell 16. If the cell 16 is subjected to conducted heat, so that its overall resistance is lowered, it is apparent that the voltage distribution between the electrodes nevertheless remains the same, so that the potential of grid 20 is not affected. This is also true if the resistance of film 14 changes with age.

The circuit here shown has an additional advantage in that the output signal is substantially independent of line voltage fluctuations. A reduction in line voltage, for example, results in the same drop in voltage at tap 29 and electrode 10 so that the balance of the circuit is unaffected. At the same time the decrease in current through tubes 17 and 18, due to the lowering of their respective grid voltages, decreases the voltage drop across cathode follower resistance 25, so decreasing the negative bias applied by this resistance to grids 20 and 23. This decrease in the negative bias tends to compensate for the drop in the voltages of electrode 10 and tap 29, thus stabilizing the current through the tubes so that the output signal across meter 32 will be very little affected by the drop in line voltage.

In place of a meter a relay or other control or signal device may be used. In such case the relay or signal device may be arranged to operate when the radiation impinging on tube reaches a predetermined intensity.

Since many variations and modifications of the device here shown will be apparent to those skilled in the art, it should be understood that this disclosure is illustrative only and that this invention includes all equivalents which fall within the scope of the claims hereto appended.

What is claimed:

1. A photo-conductive cell comprising: three consecutively spaced electrodes mounted in a transparent envelope; a film of semi-conductive, radiation-sensitive material connecting said electrodes thereby forming two consecutive resistance paths; and a shield arranged to shut off radiation from one of said paths.

2. A cell according to claim 1 having one of said electrodes disposed intermediate and equidistant from the other two.

3. A cell according to claim 2 in which said material is composed primarily of lead sulphide film deposited on a surface within said envelope, and said electrodes comprise three parallel lines of conductive material traversing said surface.

4. A cell according to claim 1 in which said material is sensitive chiefly to frequencies in the infra-red range and said shield is substantially impenetrable to frequencies in said range.

5. A photo-conductive cell comprising: a glass envelope, and a press fused thereto; three electrode leads mounted in said press; a pair of conductors running from two of said electrodes and terminating in two parallel conductive lines on the inner surface of said envelope; a third conductor running from the third of said leads to a conductive line intermediate and equidistant from said parallel lines; a film of semi-conductive material, adapted to undergo a change in conductivity when exposed to radiation, deposited over the area of said surface including said three parallel lines; and a shield of material impenetrable to radiation, covering the area between said intermediate line and one of said other lines.

6. A cell according to claim 5 wherein said film is composed primarily of lead sulphide.

7. A cell according to claim 6 wherein said shield comprises an opaque coating applied to the outer surface of said envelope.

RAYMOND H. McFEE.

REFERENCES CITED

The following references are of record in the file of this patent:

UNITED STATES PATENTS

| Number | Name | Date |
|---|---|---|
| 420,884 | Mercandier | Feb. 4, 1890 |
| 755,840 | Bose | Mar. 29, 1904 |
| 2,237,950 | Pineo | Apr. 8, 1941 |
| 2,448,516 | Cashman | Sept. 7, 1948 |

FOREIGN PATENTS

| Number | Country | Date |
|---|---|---|
| 351,468 | Great Britain | June 24, 1931 |
| 702,268 | France | Apr. 3, 1931 |
| 702,821 | France | Apr. 17, 1931 |